US010928246B2

(12) United States Patent
Suzuki et al.

(10) Patent No.: US 10,928,246 B2
(45) Date of Patent: Feb. 23, 2021

(54) OPTICAL MEASURING DEVICE COMPRISING LIGHT RECEIVING REGIONS OF LIGHT GUIDE MEMBERS OVERLAP WITH EACH OTHER IN AN INTEGRATOR

(71) Applicant: HAMAMATSU PHOTONICS K.K., Hamamatsu (JP)

(72) Inventors: Kengo Suzuki, Hamamatsu (JP); Kazuya Iguchi, Hamamatsu (JP); Yasuyuki Tanabe, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 195 days.

(21) Appl. No.: 16/316,100

(22) PCT Filed: May 12, 2017

(86) PCT No.: PCT/JP2017/018026
§ 371 (c)(1),
(2) Date: Jan. 8, 2019

(87) PCT Pub. No.: WO2018/020779
PCT Pub. Date: Feb. 1, 2018

(65) Prior Publication Data
US 2020/0271511 A1 Aug. 27, 2020

(30) Foreign Application Priority Data
Jul. 25, 2016 (JP) .............................. JP2016-145400

(51) Int. Cl.
*G01J 3/02* (2006.01)
*G01J 1/04* (2006.01)
*G01J 1/16* (2006.01)

(52) U.S. Cl.
CPC .......... *G01J 1/0492* (2013.01); *G01J 1/1626* (2013.01); *G01J 3/0254* (2013.01)

(58) Field of Classification Search
CPC .......... G01N 21/474; G01N 2201/065; G01N 15/0205; G01N 21/255; G01J 3/0254; G01J 1/0492; G01J 1/1626
(Continued)

(56) References Cited

U.S. PATENT DOCUMENTS 5,164,586 A 11/1992 Hohberg et al.
5,369,481 A * 11/1994 Berg .......................... G01J 3/02
250/228
(Continued)

FOREIGN PATENT DOCUMENTS

CN 103229043 A 7/2013
CN 104969061 A 10/2015
(Continued)

OTHER PUBLICATIONS

International Preliminary Report on Patentability dated Feb. 7, 2019 for PCT/JP2017/018026.
(Continued)

*Primary Examiner* — Que Tan Le
(74) *Attorney, Agent, or Firm* — Faegre Drinker Biddle & Reath LLP

(57) ABSTRACT

An optical measuring device includes an integrator formed with an incident opening on which excitation light is to be incident and an exit opening from which measurement light is to exit, a light guide unit for guiding the measurement light that exits from the exit opening, and a light detecting unit for detecting the measurement light guided by the light guide unit. The light guide unit includes a plurality of light guide members arranged so that incident end surfaces of the light guide members face the inside of the integrator through the exit opening. The light detecting unit detects the measurement light that is guided by at least one of the plurality of light guide members. Light-receiving regions of the
(Continued)

plurality of light guide members on the incident end surface side overlap with each other in the integrator.

9 Claims, 4 Drawing Sheets

(58) Field of Classification Search
USPC .................................. 250/228, 227.29, 239
See application file for complete search history.

(56) References Cited

U.S. PATENT DOCUMENTS

| | | |
|---|---|---|
| 5,880,504 A | 3/1999 | Smith et al. |
| 6,422,718 B1 | 7/2002 | Anderson et al. |
| 8,592,780 B2 | 11/2013 | Iguchi |
| 2001/0038451 A1 | 11/2001 | Jung et al. |

FOREIGN PATENT DOCUMENTS

| | | |
|---|---|---|
| EP | 3229000 A1 | 10/2017 |
| JP | H05-261107 A | 10/1993 |
| JP | H07-301565 A | 11/1995 |
| JP | 2000-205955 A | 7/2000 |
| JP | 2006-23284 A | 1/2006 |
| JP | 2009-103654 A | 5/2009 |
| TW | 324061 B | 1/1998 |
| WO | WO-2015/151233 A1 | 10/2015 |
| WO | WO 2016/088568 A1 | 6/2016 |

OTHER PUBLICATIONS

Jan Valenta, "Determination of absolute quantum yields of luminescing nanomaterials over a broad spectral range: from the integrating sphere theory to the correct methodology", Nanoscience Methods, vol. 3, No. 1, Jan. 10, 2014, p. 11-p. 27, XP055313394.

* cited by examiner

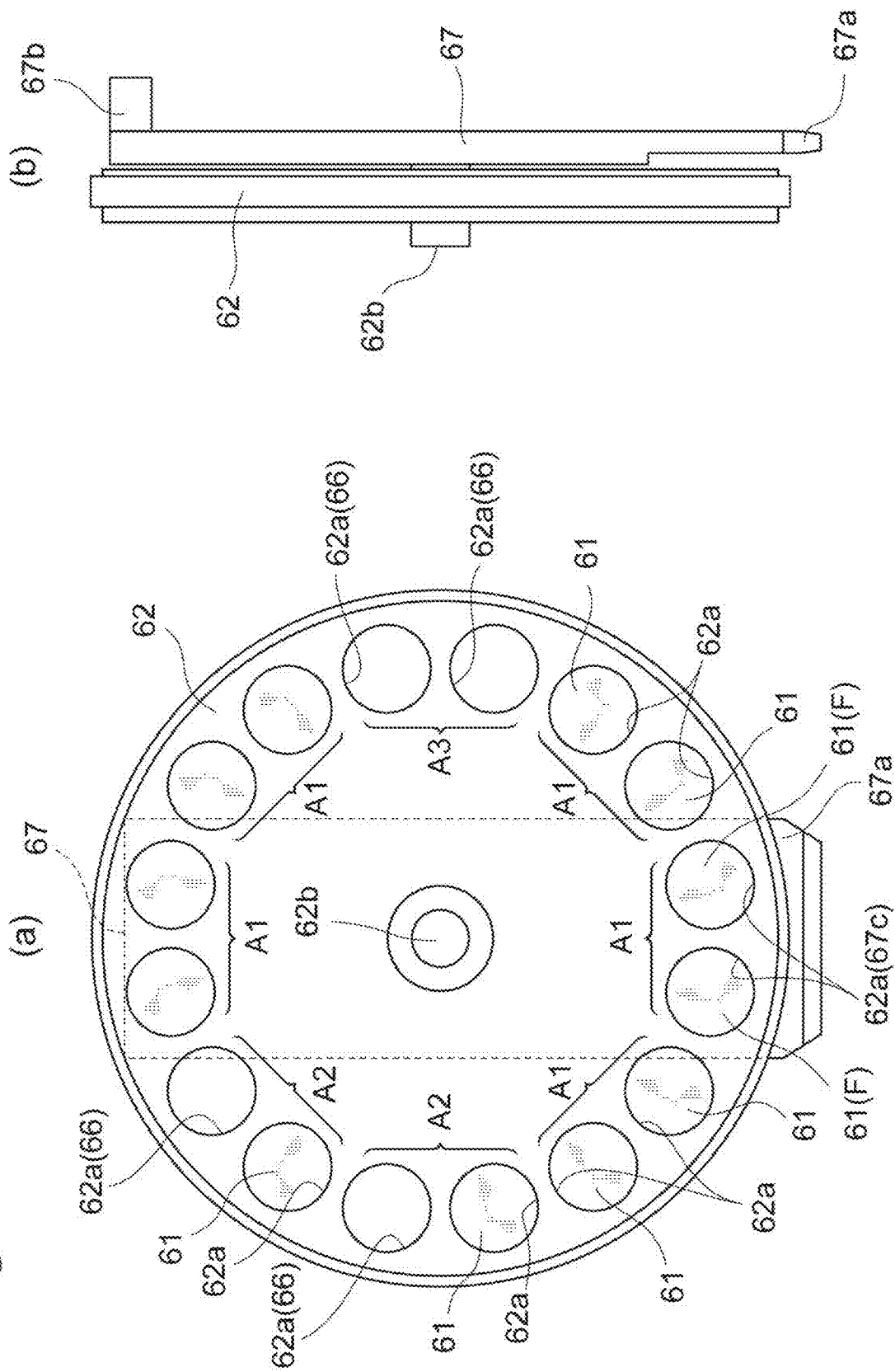

`OPTICAL MEASURING DEVICE COMPRISING LIGHT RECEIVING REGIONS OF LIGHT GUIDE MEMBERS OVERLAP WITH EACH OTHER IN AN INTEGRATOR`

TECHNICAL FIELD

An aspect of the present invention relates to an optical measuring device.

BACKGROUND ART

An optical measuring device, which irradiates a sample as an object to be measured with excitation light and detects the measurement light, has been known in the past. As this kind of technique, for example, each of Patent Literature 1 and Patent Literature 2 discloses an optical measuring device that includes an integrator in which a sample is to be disposed and photodetectors that detect measurement light exiting from an exit opening of the integrator. In the optical measuring devices disclosed in Patent Literature 1 and Patent Literature 2, a plurality of photodetectors having spectral sensitivity characteristics different from each other are used to allow the optical measuring devices to perform measurement in a wide wavelength region. A plurality of exit openings corresponding to the photodetectors are formed in the integrator.

CITATION LIST

Patent Literature

Patent Literature 1: International Publication No. 2015/151233
Patent Literature 2: Japanese Unexamined Patent Publication No. 2006-23284

SUMMARY OF INVENTION

Technical Problem

Because the plurality of exit openings corresponding to the photodetectors are formed in the integrator in the above-mentioned optical measuring device, the area of the openings of the integrator is increased. For this reason, there is a concern that the multiple diffusion and reflection characteristics of measurement light in the integrator may deteriorate. Further, because the respective photodetectors detect pieces of measurement light exiting from the exit openings that are formed at positions different from each other, there is a concern that a variation may occur in the intensity distribution of measurement light to be incident on the respective photodetectors. Accordingly, there is a concern that accuracy in the detection of measurement light may deteriorate in the above-mentioned optical measuring devices.

An aspect of the invention has been made in consideration of the above-mentioned circumstances, and an object of an aspect of the invention is to provide an optical measuring device that can accurately detect measurement light.

Solution to Problem

An optical measuring device according to an aspect of the invention is for irradiating a sample with excitation light and detecting measurement light. The optical measuring device includes an integrator formed with an incident opening on which the excitation light is to be incident and an exit opening from which the measurement light is to exit, wherein the sample is to be disposed in the integrator, a light guide unit for guiding the measurement light that exits from the exit opening, and a light detecting unit for detecting the measurement light guided by the light guide unit. The light guide unit includes a plurality of light guide members arranged so that incident end surfaces of the light guide members face the inside of the integrator through the exit opening, the light detecting unit detects the measurement light that is guided by at least one of the plurality of light guide members, and light-receiving regions of the plurality of light guide members on the incident end surface side overlap with each other in the integrator.

In the optical measuring device, the plurality of light guide members are arranged so that the incident end surfaces face the inside of the integrator through the exit opening, and the light detecting unit detects the measurement light guided by at least one of the plurality of light guide members. Accordingly, because measurement light can be taken out of the common exit opening through the plurality of light guide members, the number of exit openings to be formed in the integrator can be reduced. Therefore, the multiple diffusion and reflection characteristics of the integrator can be ensured. Further, the intensity distribution of the measurement light to be taken out by the respective light guide members can be uniformized. Furthermore, in the optical measuring device, the light-receiving regions of the plurality of light guide members on the incident end surface side overlap with each other in the integrator. Accordingly, because measurement light from the common region in the integrator is incident on the plurality of light guide members, the intensity distribution of the measurement light to be taken out by the respective light guide members can be further uniformized. Therefore, according to the optical measuring device, measurement light having uniform intensity distribution can be taken out while the multiple diffusion and reflection characteristics of the integrator can be ensured and measurement light can be accurately detected.

In the optical measuring device according to an aspect of the invention, optical axes of the plurality of light guide members on the incident end surfaces may cross each other in the integrator. In this case, the above-mentioned effect, that is, an effect, which can further uniformize the intensity distribution of measurement light to be taken out by the respective light guide members because measurement light from the common region in the integrator is incident on the plurality of light guide members, is significantly obtained.

The optical measuring device according to an aspect of the invention may further include a baffle that is disposed in the integrator at a position to face the exit opening. In this case, the baffle can prevent light, which is reflected from the sample, from being directly incident on the exit opening and measurement light can be reliably multiply diffused and reflected in the integrator.

In the optical measuring device according to an aspect of the invention, the optical axes of the plurality of light guide members on the incident end surfaces may cross each other between the exit opening and the baffle. In this case, the measurement light from the common region in the integrator can be taken out by the plurality of light guide members while the baffle prevents light, which is reflected from the sample, from being directly incident on the exit opening.

In the optical measuring device according to an aspect of the invention, the baffle may be supported by a pair of support posts that is disposed in the vicinity of the exit opening in the integrator, and a direction in which the plurality of light guide members are arranged and a direction in which the pair of support posts are arranged side by side may cross each other. In this case, it is possible to inhibit measurement light, which is to be incident on the light guide members, from being blocked by the support posts and the intensity distribution of the measurement light to be taken out by the respective light guide members can be further uniformized.

The optical measuring device according to an aspect of the invention may further include a filter unit that includes a plurality of optical filters and is capable of inserting some of the plurality of optical filters on optical paths of the respective pieces of measurement light, which are to be incident on the plurality of incident end surfaces, as inserted filters. In this case, the optical filters in accordance with the measurement conditions of the optical measuring device can be inserted on the optical paths of the respective pieces of measurement light that are to be incident on the plurality of incident end surfaces. As a result, highly accurate measurement can be performed.

In the optical measuring device according to an aspect of the invention, the filter unit may include at least one of a ND filter, a short-pass filter, a long-pass filter, a bandpass filter, a notch filter, and a filter made of a light reflective material, as the optical filters. In this case, measurement in accordance with the measurement conditions of the optical measuring device can be specifically realized.

In the optical measuring device according to an aspect of the invention, the filter unit may include a base part that is provided with the plurality of optical filters, a drive unit for driving the base part so that the inserted filters are switched among the plurality of optical filters, and a control unit for controlling the drive of the drive unit; and the control unit may select some of the plurality of optical filters as selected filters and may drive the drive unit so that the selected filters become the inserted filters. In this case, the optical filter in accordance with, for example, the measurement conditions of the optical measuring device can be selected and inserted on the optical paths by the control unit. As a result, measuring work in accordance with the measurement conditions can be facilitated.

In the optical measuring device according to an aspect of the invention, the light detecting unit may include a plurality of photodetectors of which the number is the same as the number of the plurality of light guide members, and spectral sensitivity characteristics of the plurality of photodetectors may be different from each other. In this case, because the plurality of photodetectors having spectral sensitivity characteristics different from each other are used, measurement in a wide wavelength region can be performed.

Advantageous Effects of Invention

According to an aspect of the invention, measurement light can be accurately detected.

BRIEF DESCRIPTION OF DRAWINGS

FIG. 4(a) is a front view of a base part of a filter unit. FIG. 4(b) is a side view of the base part of the filter unit.

DESCRIPTION OF EMBODIMENTS

Figure 1:
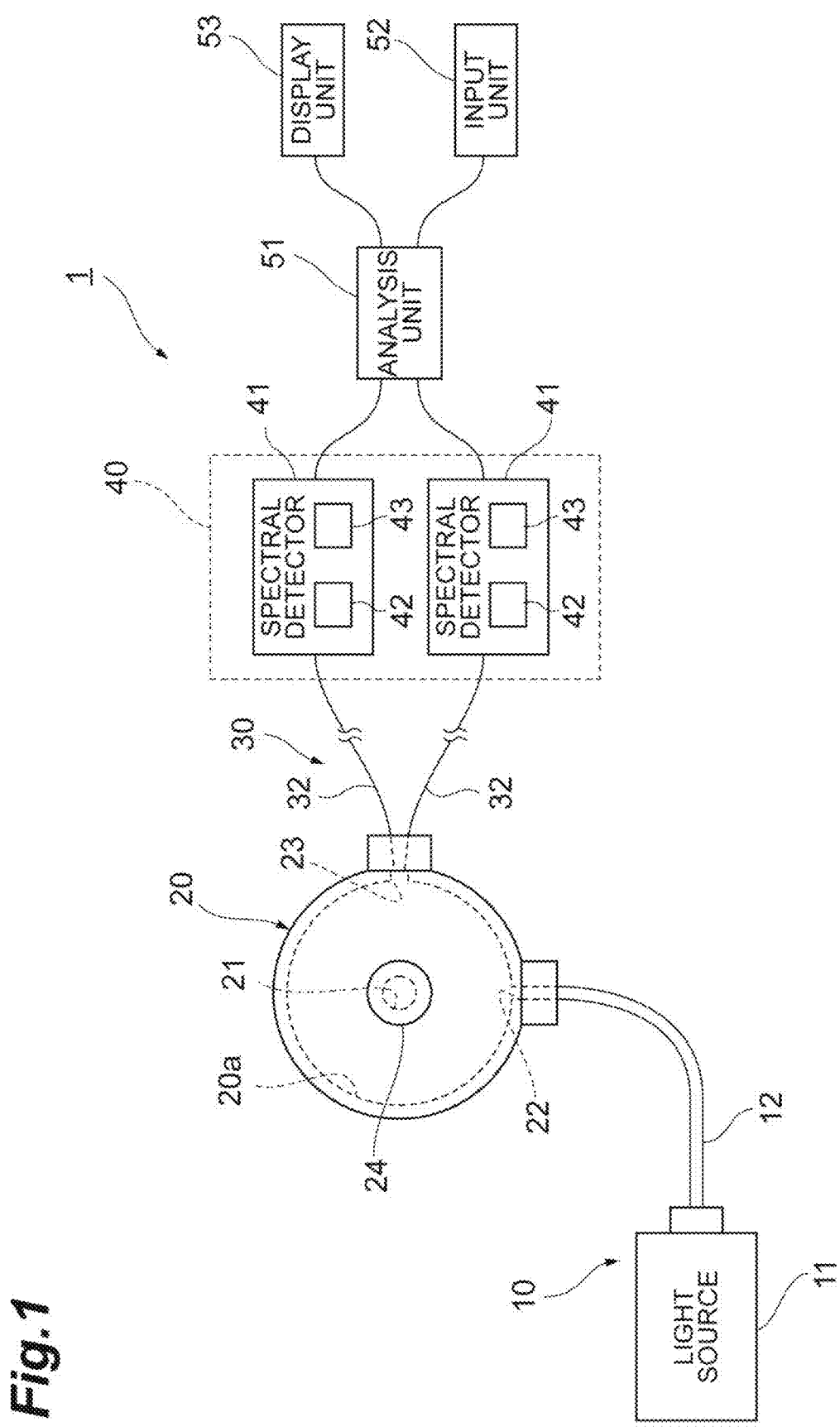
FIG. 1 is a diagram schematically illustrating the configuration of an optical measuring device according to an embodiment.

An embodiment of the invention will be described in detail below with reference to the drawings. Meanwhile, in the following description, the same or corresponding elements are denoted by the same reference numerals and the repeated description thereof will be omitted.

An optical measuring device 1 illustrated in FIG. 1 is a device that is used to measure or evaluate optical characteristics, such as fluorescence characteristics, of a sample as an object to be measured by, for example, a photoluminescence method (PL method). The sample is, for example, a fluorescent sample, such as an organic electroluminescence (EL) material or a luminescent material for a white light emitting diode (LED), a flat panel display (FPD), or the like. Materials having the forms of, for example, powder, liquid (solution), a solid or a thin film, and the like can be used as the sample.

Examples of the optical characteristics include an absorptance, internal quantum efficiency (emission quantum yield), and external quantum efficiency. An absorptance is a parameter relating to the number of photons to be absorbed. Internal quantum efficiency is a parameter relating to a ratio of the number of photons of light, which is emitted due to light emission, to the number of photons of light to be absorbed. External quantum efficiency is a parameter relating to the number of photons to be emitted. External quantum efficiency is the product of an absorptance and internal quantum efficiency. An absorptance is contrary to a reflectance that is a parameter relating to the number of photons to be reflected. An absorptance has the same meaning as "1-reflectance".

The optical measuring device 1 includes an excitation light supply unit 10, an integrator 20, a light guide unit 30, a light detecting unit 40, an analysis unit 51, an input unit 52, and a display unit 53. The excitation light supply unit 10 supplies excitation light, which has a predetermined wavelength, to the integrator 20. The excitation light supply unit 10 includes an excitation light source 11 and an incident light guide 12. In the optical measuring device 1, the excitation light supply unit 10 and the integrator 20 are optically connected to each other, the integrator 20 and the light guide unit 30 are optically connected to each other, and the light guide unit 30 and the light detecting unit 40 are optically connected to each other. The light detecting unit 40 and the analysis unit 51 are electrically connected to each other, the analysis unit 51 and the input unit 52 are electrically connected to each other, and the analysis unit 51 and the display unit 53 are electrically connected to each other.

The excitation light source 11 is a light source that generates excitation light. The excitation light source 11 includes, for example, a xenon lamp, a spectrophotometer, or the like. The wavelength of excitation light, which is generated by the excitation light source 11, may be variable. The excitation light source 11 can variably set the wavelength of excitation light in the wavelength region of, for example, 250 nm to 1600 nm. The incident light guide 12 guides excitation light, which is generated by the excitation light source 11, to the integrator 20. For example, an optical fiber and the like can be used as the incident light guide 12.

The integrator 20 is an integrating sphere and has the shape of a hollow sphere. A high-diffusion reflective material, such as barium sulfate, is applied to the inner surface 20a of the integrator 20, or the integrator 20 is made of a high-reflective material, which has a reflectance close to 1, such as PTFE or Spectralon (registered trademark). The integrator 20 is provided with one sample introduction opening 21 that is a sample introduction window used to introduce a sample, one incident opening 22 that is an incident window on which excitation light is to be incident, and one exit opening 23 that is an exit window from which measurement light is to exit. The integrator 20 may be provided with a plurality of sample introduction openings 21, a plurality of incident openings 22, and a plurality of exit openings 23.

A sample container holder 24 is inserted into and mounted in the sample introduction opening 21. The sample container holder 24 holds a sample container 2 (see FIG. 3) in which a sample is accommodated, and disposes the sample in the integrator 20. The excitation light, which is guided by the incident light guide 12, is incident on the incident opening 22. The excitation light incident from the incident opening 22 is multiply diffused and reflected in the integrator 20. Further, generated light, which is generated by the sample being irradiated with the excitation light, is multiply diffused and reflected in the integrator 20. Measurement light, which includes the excitation light and the generated light, exits from the exit opening 23. The measurement light, which exits from the exit opening 23, is guided to the light detecting unit 40, which is provided on the subsequent stage, by the light guide unit 30.

The light guide unit 30 includes a plurality of (two in this example) light guide members 32 and 32, and separately guides the measurement light by the plurality of light guide members 32. The light detecting unit 40 detects the measurement light that is guided by the light guide unit 30. The light detecting unit 40 includes a plurality of spectral detectors 41 and 41 of which the number is the same (two in this example) as the number of the plurality of light guide members 32. Each spectral detector 41 includes a spectrophotometer 42 that decomposes the measurement light into wavelength components and a photodetector 43 that detects the measurement light decomposed by the spectrophotometer 42.

The spectral sensitivity characteristics of the plurality of photodetectors 43 and 43, which are included in the light detecting unit 40, are different from each other. For example, a back-thinned (BT)-CCD linear image sensor, a CMOS linear image sensor, an InGaAs linear image sensor, and the like can be used as the photodetector 43. Each photodetector 43 outputs the wavelength spectrum data of the detected measurement light to the analysis unit 51 that is provided on the subsequent stage. The detection of the measurement light, which is to be performed by the plurality of spectral detectors 41 and 41, may be performed in parallel or may be performed at timings shifted from each other. Alternatively, only the detection of the measurement light, which is performed by one spectral detector 41, may be performed and the detection of the measurement light, which is performed by the other spectral detector 41, may not be performed. The detection of the measurement light performed in parallel includes the detection of the measurement light performed simultaneously, the detection of the measurement light performed in the same period, the detection of the measurement light performed at the same timing, or the detection of the measurement light performed simultaneously in parallel.

The analysis unit 51 is, for example, a computer. The analysis unit 51 includes, for example, a central processing unit (CPU) as a processor, a random access memory (RAM) or a read only memory (ROM) as a recording medium, and the like. The analysis unit 51 is operated when a program or the like is read on hardware, such as a CPU and a RAM. The analysis unit 51 performs necessary data analysis on wavelength spectrum data, which is created by the light detecting unit 40, by the CPU to acquire information about the sample. The analysis unit 51 performs the reading and writing of the data of the RAM by the CPU. Meanwhile, the analysis unit 51 may be a field-programmable gate array (FPGA), a microcomputer, a smart device, or a cloud server. The input unit 52 and the display unit 53 are electrically connected to the analysis unit 51. The input unit 52 is used for the input of an instruction about data analysis or the like, the input of analysis conditions, measurement conditions, or the like, and the like. The input unit 52 is, for example, an input device, such as a mouse, a keyboard, or a touch panel. The display unit 53 is used for the display of obtained data analysis results, and the like. The display unit 53 is, for example, a display or the like.

Subsequently, the integrator 20 and the light guide unit 30 will be described in more detail with reference to FIGS. 2 and 3. The integrator 20 is mounted on a mount 3 by, for example, mounting screws (not illustrated) or the like. The respective center lines of the sample introduction opening 21, the incident opening 22, and the exit opening 23 pass through the center of the integrator 20 and are orthogonal to each other.

The sample container holder 24 is inserted into and mounted in the sample introduction opening 21 as described above. The sample container holder 24 positions and holds the sample container 2 in which a sample is received. In this example, a sample is disposed at the central portion of the integrator 20.

An incident light guide holder 220, which connects the incident light guide 12 (see FIG. 1) to the integrator 20, is inserted into and mounted in the incident opening 22. The incident light guide holder 220 includes a light guide holding part 221 that positions and holds the incident light guide 12. The sample is irradiated with excitation light L, which exits from the incident light guide 12, in the integrator 20.

A mounting part 31 is inserted into and mounted in the exit opening 23. The mounting part 31 includes an opening 31a allowing measurement light, which is directed to incident end surfaces 32a of the light guide members 32 from the inside of the integrator 20, to pass therethrough. The cross-section of the opening 31a has, for example, an oval shape or an elliptical shape of which the longitudinal direction is parallel to a predetermined direction D. The predetermined direction D is a direction parallel to the center line of the incident opening 22, and coincides with a direction in which the plurality of light guide members 32 are arranged side by side as described later. The opening 31a forms a light-passing region, through which measurement light passes, in the exit opening 23.

A baffle 25 is disposed in the integrator 20 at a position to face the exit opening 23. The baffle 25 has a conical shape, and is disposed so that an apex portion 25a faces the exit opening 23. The apex portion 25a of the baffle 25 is positioned on, for example, the center line of the exit opening 23. The baffle 25 is positioned between the sample container 2 and the exit opening 23, and prevents light (primary reflected light), which is reflected from the sample, from being directly incident on the exit opening 23. Accordingly, measurement light can be reliably multiply diffused and reflected in the integrator 20.

The baffle 25 is supported by a pair of support posts 26 that is disposed in the vicinity of the exit opening 23 in the integrator 20. In this example, the pair of support posts 26 stands on the peripheral edge portion of the opening 31a of the mounting part 31, and faces each other with the opening 31a (the light-passing region of the exit opening 23) interposed therebetween. More specifically, the pair of support posts 26 is arranged side by side in a direction orthogonal to the predetermined direction D and faces each other with the center line of the exit opening 23 interposed therebetween.

To ensure multiple diffusion and reflection characteristics of the measurement light in the integrator 20, a high-diffusion reflective material is applied to the outer surfaces of the baffle 25 and the support posts 26 as in the case of the inner surface 20a of the integrator 20, or the baffle 25 and the support posts 26 are made of a high-reflective material.

The plurality of light guide members 32 are disposed so that the incident end surfaces 32a face the inside of the integrator 20 through the exit opening 23. The plurality of light guide members 32 are arranged side by side in the predetermined direction D. That is, the direction in which the plurality of light guide members 32 are arranged side by side and a direction in which the pair of support posts 26 is disposed side by side are orthogonal to each other. Each light guide member 32 guides measurement light, which is incident on the incident end surface 32a through the opening 31a of the mounting part 31, to the light detecting unit 40 that is provided on the subsequent stage. For example, a bundle of fibers or a single fiber can be used as the light guide member 32.

End portions of the light guide members 32 close to the incident end surfaces 32a are fixed to the mount 3 via a fixing member 33. The fixing member 33 includes a body part 34 that is provided with recessed portions 34a and sleeves 35 that are arranged in the recessed portions 34a. The body part 34 is fixed to the mount 3. Each recessed portion 34a has, for example, a circular cross-sectional shape. The recessed portions 34a are opened to the side of the body part 34 opposite to the exit opening 23, and extend up to positions close to the surface of the body part 34 facing the exit opening 23. The recessed portions 34a of which the number is the same as the number of the plurality of light guide members 32 are provided. In this example, two recessed portions 34a are provided at positions to face each other with the center line of the exit opening 23 interposed therebetween. The two recessed portions 34a are arranged side by side in the predetermined direction D in a state in which the two recessed portions 34a are inclined with respect to the center line of the exit opening 23 so that axes of the recessed portions 34a become close to each other as becoming close to the exit opening 23. An opening 34b, which passes through the surface of the body part 34 facing the exit opening 23, is formed at the bottom of each recessed portion 34a.

The sleeves 35 have, for example, a cylindrical shape. Each sleeve 35 is coaxially inserted into the recessed portion 34a and is in contact with the bottom of the recessed portion 34a, so that each sleeve 35 is positioned with respect to the body part 34. The sleeves 35 are fixed to the body part 34 by screws 34c. Accordingly, the sleeves 35 are provided in the body part 34 along the recessed portions 34a as follows. That is, the sleeves 35 of which the number is the same as the number of the plurality of light guide members 32 are provided. In this example, two sleeves 35 are provided at positions facing each other with the center line of the exit opening 23 interposed therebetween. The two sleeves 35 are arranged side by side in the predetermined direction D in a state in which the two sleeves 35 are inclined with respect to the center line of the exit opening 23 so that axes of the two sleeves 35 become close to each other as becoming close to the exit opening 23.

The end portions of the light guide members 32 close to the incident end surfaces 32a are coaxially arranged in the sleeves 35, and extend straight along the sleeves 35. The end portions of the light guide members 32 are provided in the sleeves 35 so that the incident end surfaces 32a are flush with end faces of the sleeves 35 on the exit opening 23 side. The incident end surfaces 32a of the light guide members 32 are exposed to the outside through the openings 34b. The end portions of the light guide members 32 are fixed in the sleeves 35 by, for example, an adhesive.

The light guide members 32 allow light, which correspond to light-receiving regions thereof on the incident end surfaces 32a side, to be incident thereon and can guide the light. Here, light, which can be incident on the incident end surface 32a of the light guide member 32, is light corresponding to a region within a viewing angle on the side close to the incident end surface 32a (that is, the maximum incident angle of light that can be incident on the incident end surface 32a). That is, the light-receiving region of the light guide member 32 means a region (detection view field) within a viewing angle on the side close to the incident end surface 32a of the light guide member 32. The size of the light-receiving region of the light guide member 32 is prescribed by the numerical aperture (NA) of the incident end surface 32a. For example, the light-receiving region of the light guide member 32 is a conical region of which the apex side corresponds to the incident end surface 32a. The ranges of the light-receiving regions of the light guide members 32 are illustrated in FIGS. 2 and 3 by a two-dot chain line.

Figure 2:
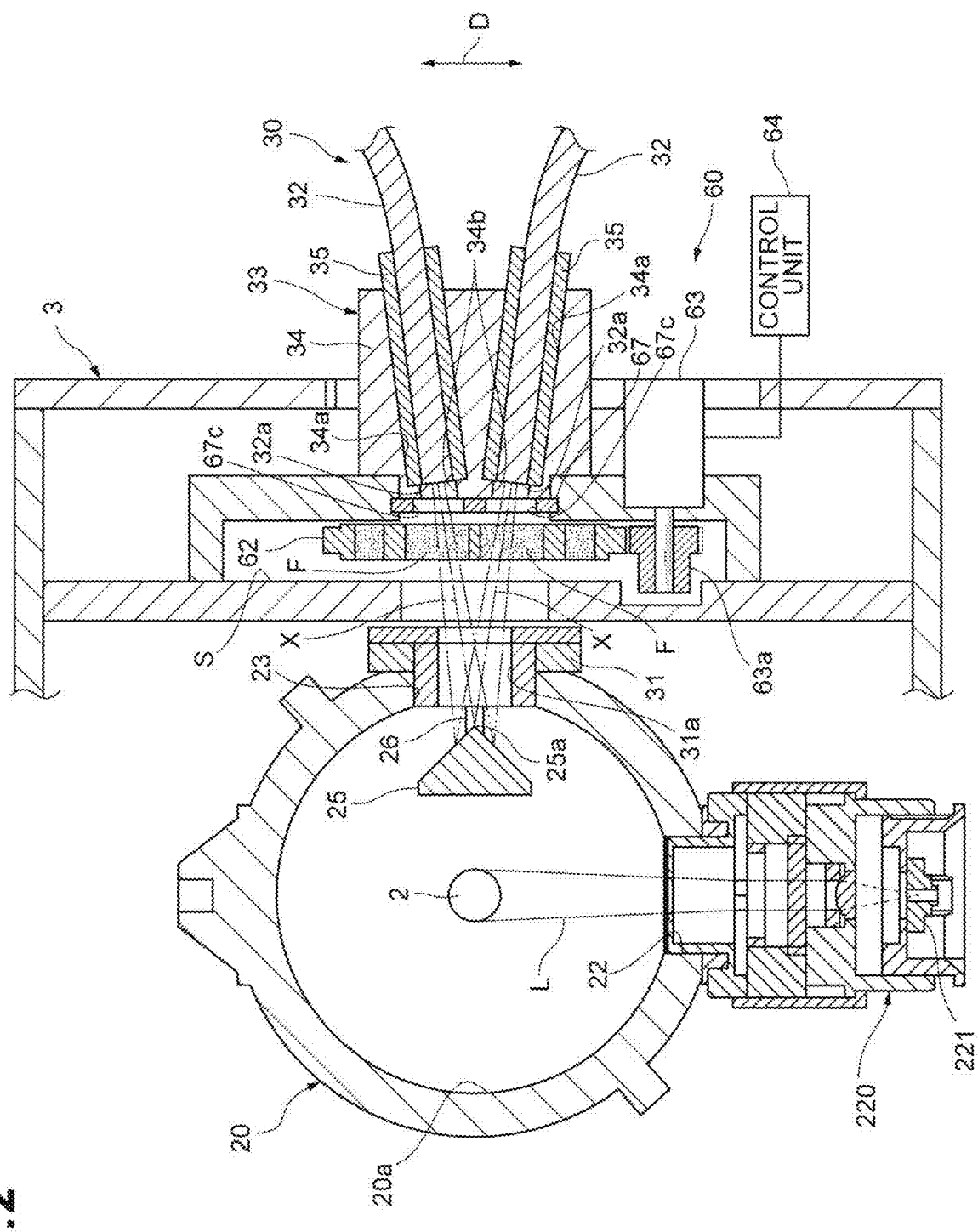
FIG. 2 is a schematic cross-sectional view illustrating one cross-section of a main portion of the optical measuring device of FIG. 1.

As shown in FIG. 2, the light-receiving regions of the plurality of light guide members 32 overlap with each other in the integrator 20. Specifically, optical axes X of the incident end surfaces 32a of the plurality of light guide members 32 cross each other at the apex portion 25a of the baffle 25. Each of the light-receiving regions of the plurality of light guide members 32 radially spreads around the optical axis X as a central axis thereof from the incident end surface 32a. The light-receiving regions of the plurality of light guide members 32 overlap with each other in a predetermined region around the apex portion 25a. Accordingly, measurement light from a common region in the integrator 20 is incident on the plurality of light guide members 32.

Figure 3:
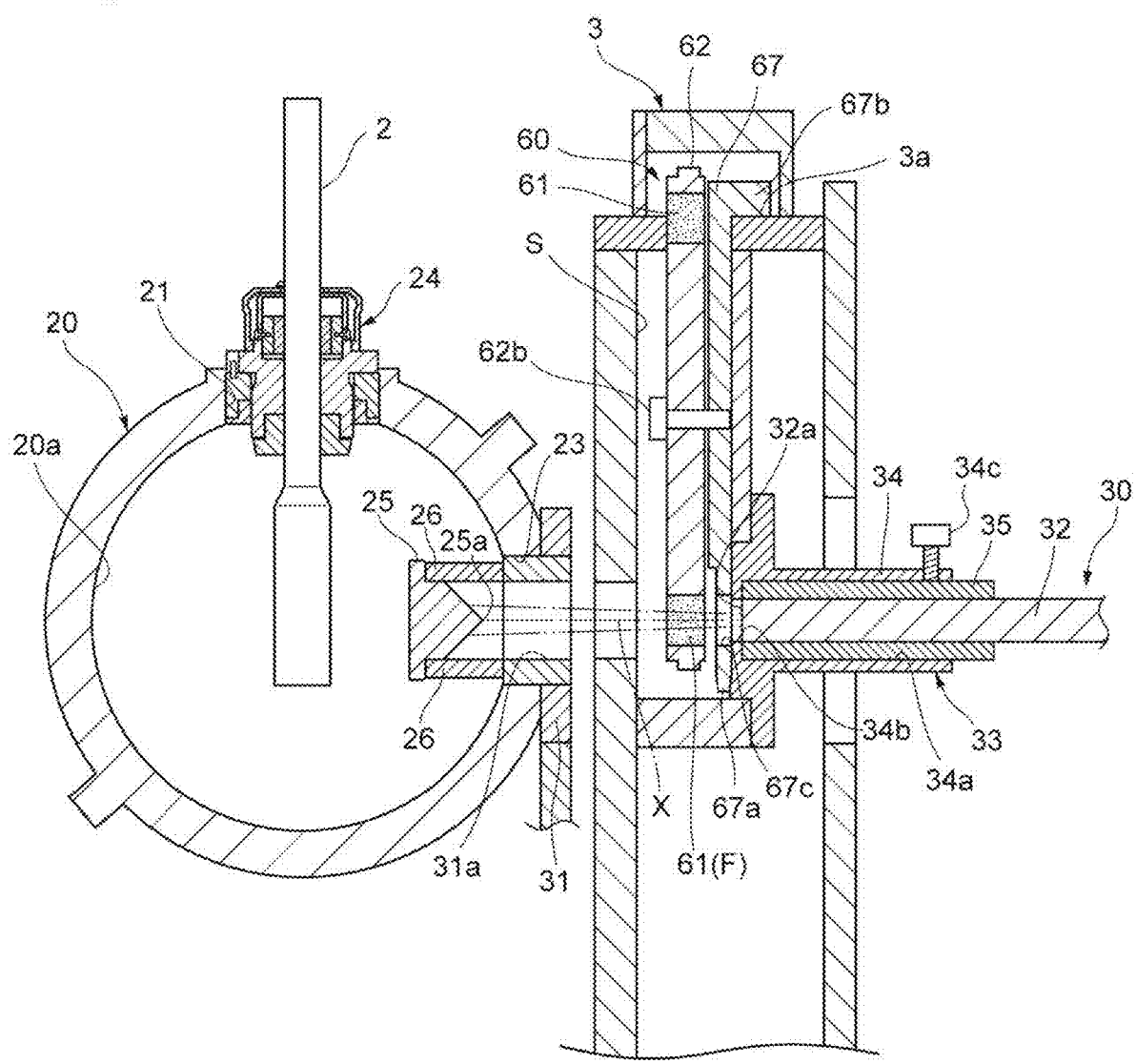
FIG. 3 is a schematic cross-sectional view illustrating another cross-section of the main portion of the optical measuring device of FIG. 1.

As illustrated in FIGS. 2, 3, and 4, the optical measuring device 1 further includes a filter unit 60. The filter unit 60 includes a plurality of optical filters 61, a base part 62 that is provided with the plurality of optical filters 61, a drive unit 63 that drives the base part 62, and a control unit 64 that controls the drive of the drive unit 63. The drive unit 63 and the control unit 64 are electrically connected to each other.

The base part 62 has the shape of a circular plate. A plurality of arrangement holes 62a are provided at the peripheral edge portion of the base part 62 so as to be arranged at regular intervals in a circumferential direction. Each arrangement hole 62a has, for example, a circular cross-sectional shape, and passes through the base part 62 in a thickness direction. The optical filters 61 are arranged in some of the plurality of arrangement holes 62a, and the others of the plurality of arrangement holes 62a form opening portions 66 without the arrangement of the optical filters 61. That is, the base part 62 is provided with the opening portions 66, which allow measurement light to pass therethrough just as it is, in addition to the optical filters 61 that filter the measurement light.

Any filters in accordance with specifications can be employed as the optical filters 61 that are to be arranged in the arrangement holes 62a. For example, a neutral density (ND) filter, a short-pass filter, a long-pass filter, a bandpass filter, a notch filter, a filter that is made of a light reflective material, and the like can be used as the optical filter 61. Spectralon (registered trademark), which is a material provided on the inner surface 20a of the integrator 20 and has high reflectance and excellent diffusibility, can be used as the light reflective material. That is, a Spectralon filter, which is formed in the shape of a sheet and is made of Spectralon having substantially constant reflectance over a wide wavelength region from a visible range up to a near infrared range, can be used as the optical filter 61.

Any arrangement in accordance with specifications can be employed as the arrangement of the optical filters 61 and the opening portions 66. For example, in an example of the arrangement illustrated in FIG. 4, the base part 62 includes a plurality of first sets A1, a plurality of second sets A2, and one third set A3. Each first set A1 includes two optical filters 61 that are adjacent to each other in the circumferential direction. Each second sets A2 includes the optical filter 61 and the opening portion 66 that are adjacent to each other in the circumferential direction. The third set A3 includes two opening portions 66 that are adjacent to each other in the circumferential direction. The combinations of the types of the optical filters 61 included in the first sets A1 are different from each other between the plurality of first sets A1. The types of the optical filters 61 included in the second sets A2 are different from each other between the plurality of second sets A2. As long as the combinations of the types of the optical filters are different from each other between the plurality of first sets A1, the types of two optical filters 61 included in one first set A1 may be different from each other or may be the same type. Meanwhile, a plurality of types of filters may be arranged in one arrangement hole 62a so as to overlap with each other.

The base part 62 is connected to a support part 67 by a shaft portion 62b, and is adapted to be rotatable about the shaft portion 62b as a rotating shaft with respect to the support part 67. The support part 67 has, for example, the shape of a rectangular plate. One end of the support part 67 in a longitudinal direction forms a protruding portion 67a that protrudes from the outer peripheral edge of the base part 62. The protruding portion 67a has a tapered shape. In a case in which the base part 62 is to be inserted into a filter unit-arrangement space S, which is formed in the mount 3, from the protruding portion 67a, the insertion of the base part 62 can be guided by the base part 62 while the protruding portion 67a is made to be in contact with the mount 3. Accordingly, it is possible to facilitate work for inserting the base part 62 and the support part 67. Further, because the protruding portion 67a protrudes from the outer peripheral edge of the base part 62, the interference of the base part 62, eventually, damage or the like to the base part 62 can be suppressed.

The other end of the support part 67 in the longitudinal direction is provided with a contact portion 67b. The contact portion 67b is in contact with a support surface 3a of the mount 3 in a state in which the base part 62 and the support part 67 are arranged in the filter unit-arrangement space S. The contact portion 67b is in contact with the support surface 3a and the back of the support part 67 (the surface of the support part 67 on which the contact portion 67b is provided) is in contact with the mount 3, so that the support part 67 is positioned with respect to the mount 3. The support part 67 is provided with openings 67c. The openings 67c are provided at positions through which the respective pieces of measurement light to be incident on the incident end surfaces 32a of the plurality of light guide members 32 pass. A plurality of openings 67c of which the number is the same as the number of the plurality of light guide members 32 are provided. The cross-sectional shape of the opening 67c is the same as the cross-sectional shape of the arrangement hole 62a. For example, the cross-sectional shape of the opening 67c is a circular cross-sectional shape.

When the base part 62 is rotated with respect to the support part 67 in a state in which the support part 67 is positioned with respect to the mount 3, some of the plurality of optical filters 61 can be inserted on the optical paths of the respective pieces of measurement light, which are to be incident on the incident end surfaces 32a of the plurality of light guide members 32, as inserted filters F. Further, in a case in which the base part 62 is provided with the opening portions 66 as in this embodiment, the opening portion 66 can also be disposed on at least one of the respective optical paths.

The drive unit 63 is, for example, a motor, and is adapted to be capable of transmitting a rotational drive force to the base part 62 in a case in which a gear 63a connected to a drive shaft meshes with a gear portion (not illustrated) formed on the outer peripheral surface of the base part 62. The drive unit 63 drives the base part 62 in accordance with a signal output from the control unit 64 so that the inserted filters F are switched among the plurality of optical filters 61.

The control unit 64 is formed of, for example, a computer that includes a central processing unit (CPU), a read only memory (ROM), a random access memory (RAM), and the like. Further, the control unit 64 may be a field-programmable gate array (FPGA) or a microcomputer. The control unit 64 may be provided independently of the analysis unit 51, the input unit 52, and the display unit 53, and may be integrated with at least any of the analysis unit 51, the input unit 52, and the display unit 53.

The control unit 64 selects some of the plurality of optical filters 61 as selected filters in accordance with the measurement conditions of the optical measuring device 1. The control unit 64 drives the drive unit 63 so that the selected filters become the inserted filters F. The more specific operation of the control unit 64 will be described below.

The control unit 64 is connected to the input unit 52 so as to be capable of communicating with the input unit 52 and receives measurement conditions input to the input unit 52. The measurement conditions include, for example, the type of a sample, optical characteristics to be measured, the type, wavelength, and intensity of excitation light, the spectral sensitivity characteristics of the photodetector 43, and the like. For example, in a case in which one photodetector 43 is a BT-CCD linear image sensor, the other photodetector 43 is an InGaAs linear image sensor, and excitation light is a laser beam, a short-pass filter is disposed as the optical filter 61 on the optical path of measurement light detected by one photodetector 43 and the opening portion 66 is disposed on the optical path of measurement light detected by the other photodetector 43.

The arrangement relationship of the optical filters 61 and the opening portions 66, that is, the arrangement relationship of the first to third sets A1 to A3 on the base part 62 is stored in the control unit 64 in advance. The control unit 64 disposes the optical filter 61 or the opening portion 66, which is included in any of the first to third sets A1 to A3, on each optical path by driving the drive unit 63 on the basis of the measurement conditions with reference to the arrangement relationship.

More specifically, first, the control unit 64 selects any of the first to third sets A1 to A3 in accordance with the measurement conditions. For example, the control unit 64 selects one first set A1. Selecting one first set A1 corresponds to a case in which the optical filter 61 inserted on the optical path of measurement light detected by one photodetector 43 is selected and the optical filter 61 inserted on the optical path of measurement light detected by the other photodetector 43 is selected. Then, the control unit 64 drives the drive unit 63 to a rotational position where the two optical filters 61 included in the selected first set A1 become inserted filters F.

Alternatively, the control unit 64 selects one second set A2 in accordance with the measurement conditions. The selection of one second set A2 corresponds to the selection of a case in which the optical filter 61 inserted on the optical path of measurement light detected by one photodetector 43 is selected and the opening portion 66 is disposed on the optical path of measurement light detected by the other photodetector 43. Then, the control unit 64 drives the drive unit 63 to a rotational position where the optical filter 61 included in the selected second set A2 becomes an inserted filter F and the opening portion 66 is positioned on the optical path.

Alternatively, the control unit 64 selects the third set A3 in accordance with the measurement conditions. The selection of the third set A3 corresponds to the selection of a case in which the opening portions 66 are disposed on the optical paths of the respective pieces of measurement light detected by the two photodetectors 43. Then, the control unit 64 drives the drive unit 63 to a rotational position where two opening portions 66 are positioned on the respective optical paths.

In the above-mentioned optical measuring device 1, a sample is irradiated with excitation light incident from the incident opening 22 and measurement light including generated light generated by the sample is multiply diffused and reflected in the integrator 20. In this case, because the baffle 25 prevents light, which is reflected from the sample, from being directly incident on the exit opening 23, measurement light is reliably multiply diffused and reflected in the integrator 20. Further, the measurement light, which is multiply diffused and reflected and uniformized, is incident on the incident end surfaces 32a of the plurality of light guide members 32 from a common light-receiving region in the integrator 20 through one exit opening 23. The pieces of measurement light, which are incident on the respective incident end surfaces 32a, are detected in parallel or at timings shifted from each other by the light detecting unit 40 including the plurality of photodetectors 43, and are analyzed by the analysis unit 51. The analysis results of the analysis unit 51 are displayed on the display unit 53.

As described above, in the optical measuring device 1, the plurality of light guide members 32 are arranged so that the incident end surfaces 32a face the inside of the integrator 20 through the exit opening 23, and the light detecting unit 40 detects the measurement light guided by the plurality of light guide members 32. Accordingly, because measurement light can be taken out of the common exit opening 23 through the plurality of light guide members 32, the number of exit openings 23 to be formed in the integrator 20 can be reduced. Therefore, the multiple diffusion and reflection characteristics of the integrator 20 can be ensured. Further, the intensity distribution of the measurement light to be taken out by the respective light guide members 32 can be uniformized. Furthermore, in the optical measuring device 1, the light-receiving regions of the plurality of light guide members 32 on the incident end surface 32a side overlap with each other in the integrator 20. Accordingly, because measurement light from the common region in the integrator 20 is incident on the plurality of light guide members 32, the intensity distribution of the measurement light to be taken out by the respective light guide members 32 can be further uniformized. Therefore, according to the optical measuring device 1, measurement light having uniform intensity distribution can be taken out while the multiple diffusion and reflection characteristics of the integrator 20 can be ensured and measurement light can be accurately detected.

In comparison with a case in which measurement light taken out through one light guide member 32 can be switched and guided to the plurality of photodetectors 43 by a switcher or the like unlike in the case of the optical measuring device 1, measurement light taken out through the plurality of light guide members 32 at the same timing can be detected in the optical measuring device 1. Accordingly, measurement light can be accurately detected. Further, because the switcher or the like is not required, the structure of the device can also be simplified. Furthermore, because measurement light is taken out of the common exit opening 23 through the plurality of light guide members 32 in the optical measuring device 1, a case where a plurality of pieces of measurement light cannot be taken out due to the lack of opening hardly occurs even though, for example, the number of openings to be formed in the integrator 20 is determined in advance.

In the optical measuring device 1, the optical axes X of the plurality of light guide members 32 on the incident end surfaces 32a cross each other in the integrator 20. Accordingly, the above-mentioned effect, that is, an effect, which can further uniformize the intensity distribution of measurement light to be taken out by the respective light guide members 32 because measurement light from the common region in the integrator 20 is incident on the plurality of light guide members 32, is significantly obtained.

The optical measuring device 1 further includes the baffle 25 that is disposed in the integrator 20 at a position to face the exit opening 23. Accordingly, the baffle 25 can prevent light, which is reflected from the sample, from being directly incident on the exit opening 23 and measurement light can be reliably multiply diffused and reflected in the integrator 20.

In the optical measuring device 1, the optical axes X of the plurality of light guide members 32 on the incident end surfaces 32a cross each other between the exit opening 23 and the baffle 25. Accordingly, the measurement light from the common region in the integrator 20 can be taken by the plurality of light guide members 32 while the baffle 25 prevents light, which is reflected from the sample, from being directly incident on the exit opening 23.

In the optical measuring device 1, the baffle 25 is supported by the pair of support posts 26 disposed around the exit opening 23 in the integrator 20 and the direction in which the plurality of light guide members 32 are arranged side by side and the direction in which the pair of support posts 26 is disposed side by side are orthogonal to each other. Accordingly, it is possible to inhibit measurement light, which is to be incident on the light guide members 32, from being blocked by the support posts 26 and the intensity distribution of the measurement light to be taken out by the respective light guide members 32 can be further uniformized.

The optical measuring device 1 includes the filter unit 60 that includes the plurality of optical filters 61 and can insert some of the plurality of optical filters 61 on the optical paths of the respective pieces of measurement light, which are to be incident on the plurality of incident end surfaces 32a, as inserted filters F. Accordingly, the optical filters 61 in accordance with the measurement conditions of the optical measuring device 1 can be inserted on the optical paths of the respective pieces of measurement light that are to be incident on the plurality of incident end surfaces 32a. As a result, highly accurate measurement can be performed.

In the optical measuring device 1, the filter unit 60 includes at least one of a ND filter, a short-pass filter, a long-pass filter, a bandpass filter, a notch filter, and a filter made of a light reflective material, as the optical filters 61. Accordingly, measurement in accordance with the measurement conditions of the optical measuring device 1 can be specifically realized.

In the optical measuring device 1, the filter unit 60 includes the base part 62 that is provided with the plurality of optical filters 61, the drive unit 63 that drives the base part 62 so that the inserted filters F are switched among the plurality of optical filters 61, and the control unit 64 that controls the drive of the drive unit 63. Further, the control unit 64 selects some of the plurality of optical filters 61 as selected filters, and drives the drive unit 63 so that the selected filters become the inserted filters F. Accordingly, the optical filters 61 in accordance with, for example, the measurement conditions of the optical measuring device 1 can be selected and inserted on the optical paths by the control unit 64. As a result, measuring work in accordance with the measurement conditions can be facilitated in comparison with a case in which, for example, the inserted filters F are manually switched.

In the optical measuring device 1, the light detecting unit 40 includes the plurality of photodetectors 43 of which the number is the same as the number of the plurality of light guide members 32, and the spectral sensitivity characteristics of the plurality of photodetectors 43 are different from each other. In this case, because the plurality of photodetectors 43 having spectral sensitivity characteristics different from each other are used, measurement in a wide wavelength region can be performed.

One embodiment of the invention has been described above, but the invention is not limited to the embodiment. For example, an integrating sphere has been used as the integrator 20 in the embodiment, but the integrator 20 may be means (optical component) for spatially integrating light therein. For example, an integrating hemisphere disclosed in Japanese Unexamined Patent Publication No. 2009-103654 may be used as the integrator 20.

In the embodiment, the light detecting unit 40 may include the photodetectors 43 (spectral detectors 41) of which the number is the same as the number of the plurality of light guide members 32 to be arranged. In this case, for example, the light detecting unit 40 may detect only the measurement light guided by some light guide members 32 and may not detect the measurement light guided by the other light guide members 32. The light guide members 32 of which the measurement light is not detected may be closed by rod-like members or the like so that light does not enter the integrator 20. That is, the light detecting unit 40 may have only to detect measurement light that is guided by at least one of the plurality of light guide members 32.

In the embodiment, the optical measuring device 1 may include three or more light guide members 32. In this case, the plurality of light guide members 32 may be arranged side by side in a line, may be arranged side by side in a plurality of lines, may be arranged side by side in a circular shape, and may be arranged side by side in a rectangular shape. The direction in which the plurality of light guide members 32 are arranged side by side and the direction in which the pair of support posts 26 is disposed side by side have been orthogonal to each other in the embodiment, but may cross each other at an angle other than a right angle. Alternatively, the direction in which the plurality of light guide members 32 are arranged side by side and the direction in which the pair of support posts 26 is disposed side by side may not cross each other.

The optical axes X of the incident end surfaces 32a of the plurality of light guide members 32 have crossed each other at the apex portion 25a of the baffle 25 in the embodiment, but may cross each other in the integrator 20 and may cross each other at other positions between the exit opening 23 and the baffle 25. In the embodiment, the light-receiving regions of the plurality of light guide members 32 have only to overlap with each other in the integrator 20 and the optical axes X of the plurality of light guide members 32 may not cross each other in the integrator 20.

In the embodiment, the base part 62 may not be provided with the opening portions 66. In this case, the optical filters 61 are arranged in all the arrangement holes 62a. The base part 62 has included the first sets A1, the second sets A2, and the third set A3 in the embodiment, but may include only the first sets A1 and the second sets A2 or may include only the first sets A1 and the third set A3. The base part 62 may have an arbitrary shape, and may have, for example, the shape of a rectangular plate. The base part 62 may be adapted to be capable of switching the inserted filters F by sliding on the support part 67. The filter unit 60 may not include the drive unit 63, and the base part 62 may be adapted to be, for example, manually rotatable.

In the embodiment, the filter unit 60 may include two base parts 62 that are disposed so as to face each other. In this case, because optical filters 61 of one base part 62 and optical filters 61 of the other base part 62 can be used so as to overlap with each other on the optical paths of the measurement light, the number of combinations of the optical filters 61, which can be selected, can be increased. The optical measuring device 1 may not include the filter unit 60.

In the embodiment, the opening 31a of the mounting part 31 may have a circular cross-sectional shape. However, in a case in which the plurality of light guide members 32 are arranged side by side in the predetermined direction D as in the embodiment, it is preferable that the cross-section of the opening 31a has an oval shape or an elliptical shape of which the longitudinal direction is the predetermined direction D. This is because, in this case, a ratio of light, which is not incident on the incident end surfaces 32a of the plurality of light guide members 32, to measurement light passing through the opening 31a can be reduced.

In the embodiment, a sample may be disposed at a position other than the central portion of the integrator 20, and may be disposed, for example, so as to be placed on the side opposite to the sample introduction opening 21 in the integrator 20. In this case, the baffle stands on the inner surface of the integrator 20 between the placed sample and the exit opening 23, and may be provided at a position away from the center line of the exit opening 23. In a case in which such a baffle is provided, it is preferable that the direction in which the plurality of light guide members 32 are arranged side by side crosses the direction in which the exit opening 23 and the baffle are arranged side by side, to inhibit measurement light, which is to be incident on the incident end surfaces 32a of the plurality of light guide members 32, from being blocked by the baffle.

The support posts 26 have been provided on the mounting part 31 in the embodiment, but may be provided on the inner surface 20a of the integrator 20. Alternatively, the baffle 25 may be directly provided on the inner surface 20a of the integrator 20 without the support posts 26. The shape of the baffle 25 may be capable of preventing light, which is reflected from the sample, from being directly incident on the exit opening 23, and may be the shape of a flat plate, or the like.

REFERENCE SIGNS LIST

1: optical measuring device, 20: integrator, 22: incident opening, 23: exit opening, 25: baffle, 26: support post, 30: light guide unit, 32: light guide member, 32a: incident end surface, 40: light detecting unit, 43: photodetector, 60: filter unit (filter unit), 61: optical filter, 62: base part, 63: drive unit, 64: control unit, F: inserted filter, L: excitation light, X: optical axis.

The invention claimed is:

1. An optical measuring device configured to irradiate a sample with excitation light and to detect measurement light, the optical measuring device comprising:
an integrator formed with an incident opening on which the excitation light is to be incident and an exit opening from which the measurement light is to exit, wherein the sample is to be disposed in the integrator;
a light guide unit configured to guide the measurement light that exits from the exit opening; and
a light detecting unit configured to detect the measurement light guided by the light guide unit,
wherein the light guide unit comprises a plurality of light guide members arranged so that incident end surfaces of the light guide members face the inside of the integrator through the exit opening,
the light detecting unit detects the measurement light that is guided by at least one of the plurality of light guide members, and
light-receiving regions on the incident end surface side of the plurality of light guide members overlap with each other in the integrator.

2. The optical measuring device according to claim 1, wherein optical axes of the plurality of light guide members on the incident end surfaces cross each other in the integrator.

3. The optical measuring device according to claim 1, further comprising:
a baffle that is disposed in the integrator at a position to face the exit opening.

4. The optical measuring device according to claim 3, wherein the optical axes of the plurality of light guide members on the incident end surfaces cross each other between the exit opening and the baffle.

5. The optical measuring device according to claim 3, wherein the baffle is supported by a pair of support posts that is disposed in the vicinity of the exit opening in the integrator, and
a direction in which the plurality of light guide members are arranged and a direction in which the pair of support posts are arranged cross each other.

6. The optical measuring device according to claim 1, further comprising:
a filter unit that comprises a plurality of optical filters and is capable of inserting some of the plurality of optical filters on optical paths of the respective pieces of measurement light, which are to be incident on the plurality of incident end surfaces, as inserted filters.

7. The optical measuring device according to claim 6, wherein the filter unit comprises at least one of a ND filter, a short-pass filter, a long-pass filter, a bandpass filter, a notch filter, and a filter made of a light reflective material, as the optical filters.

8. The optical measuring device according to claim 6, wherein the filter unit comprises a base part that is provided with the plurality of optical filters, a drive unit configured to drive the base part so that the inserted filters are switched among the plurality of optical filters, and a control unit configured to control the drive of the drive unit, and
the control unit selects some of the plurality of optical filters as selected filters, and drives the drive unit so that the selected filters become the inserted filters.

9. The optical measuring device according to claim 1, wherein the light detecting unit comprises a plurality of photodetectors of which the number is the same as the number of the plurality of light guide members, and
spectral sensitivity characteristics of the plurality of photodetectors are different from each other.

* * * * *